April 29, 1930.  L. J. R. HOLST  1,756,062
MEASURING STEREOSCOPE
Filed May 13, 1924    3 Sheets-Sheet 1
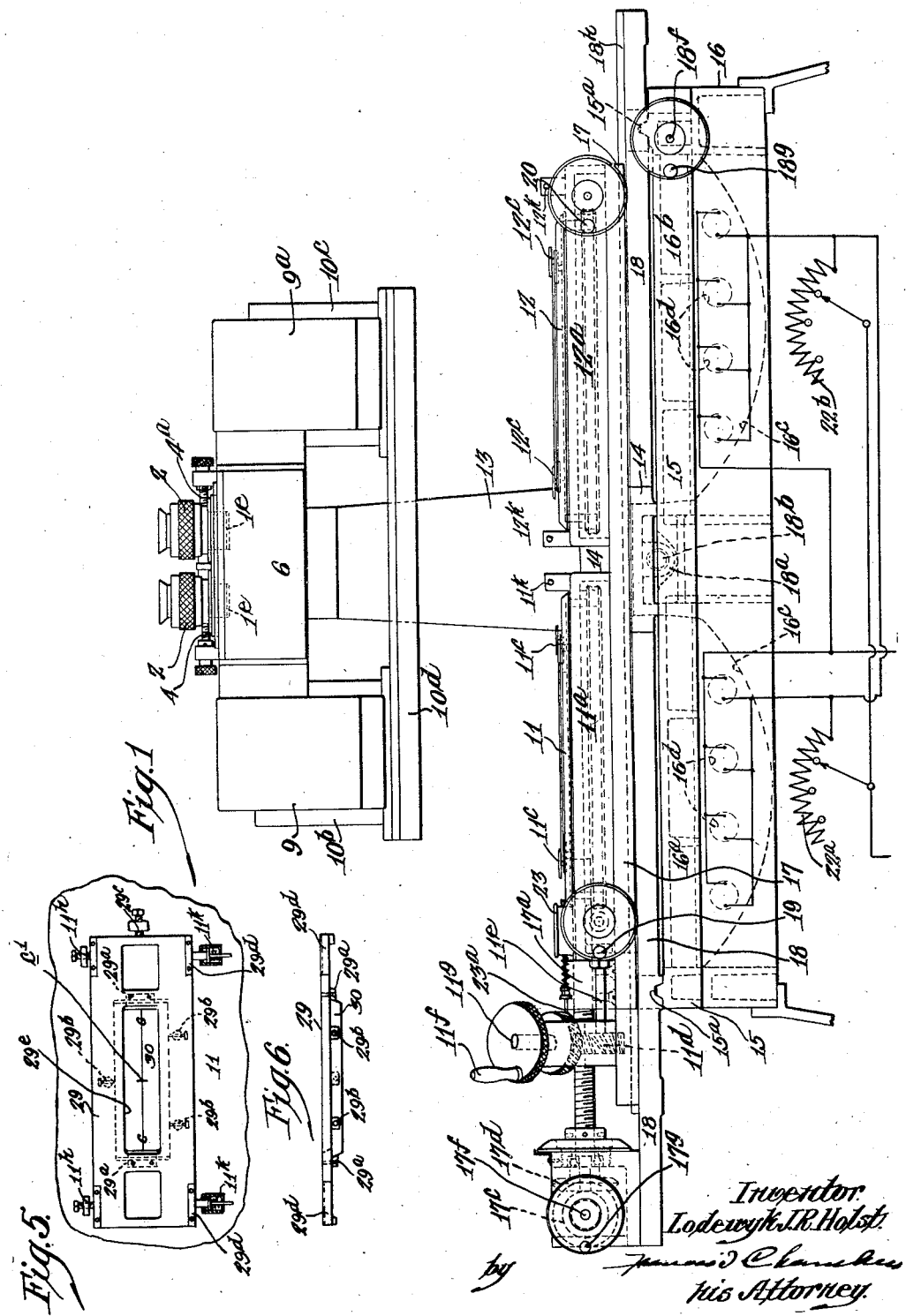

April 29, 1930. L. J. R. HOLST 1,756,062
MEASURING STEREOSCOPE
Filed May 13, 1924   3 Sheets-Sheet 2
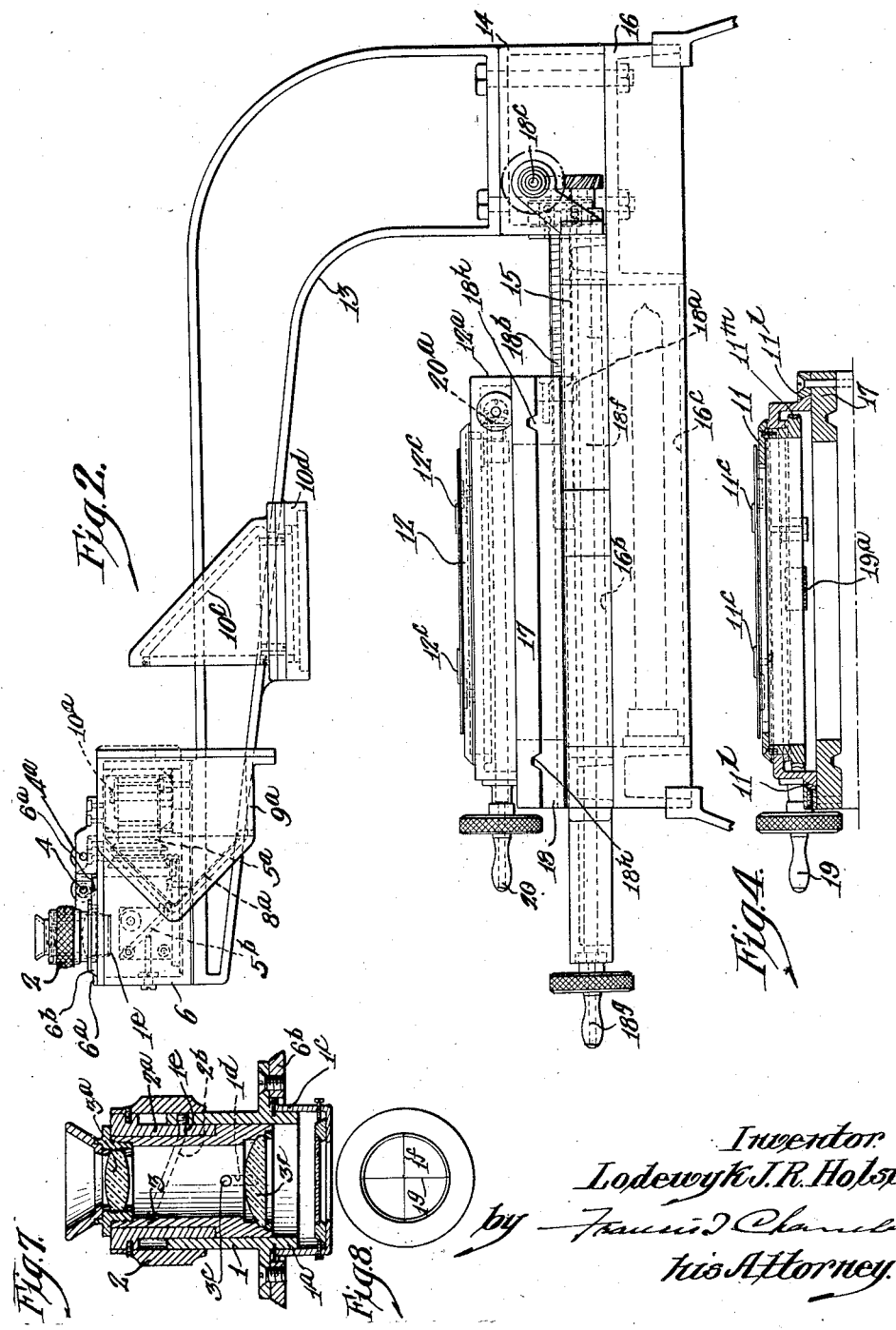
Inventor
Lodewyk J. R. Holst
by Francis D. Chambers
his Attorney.

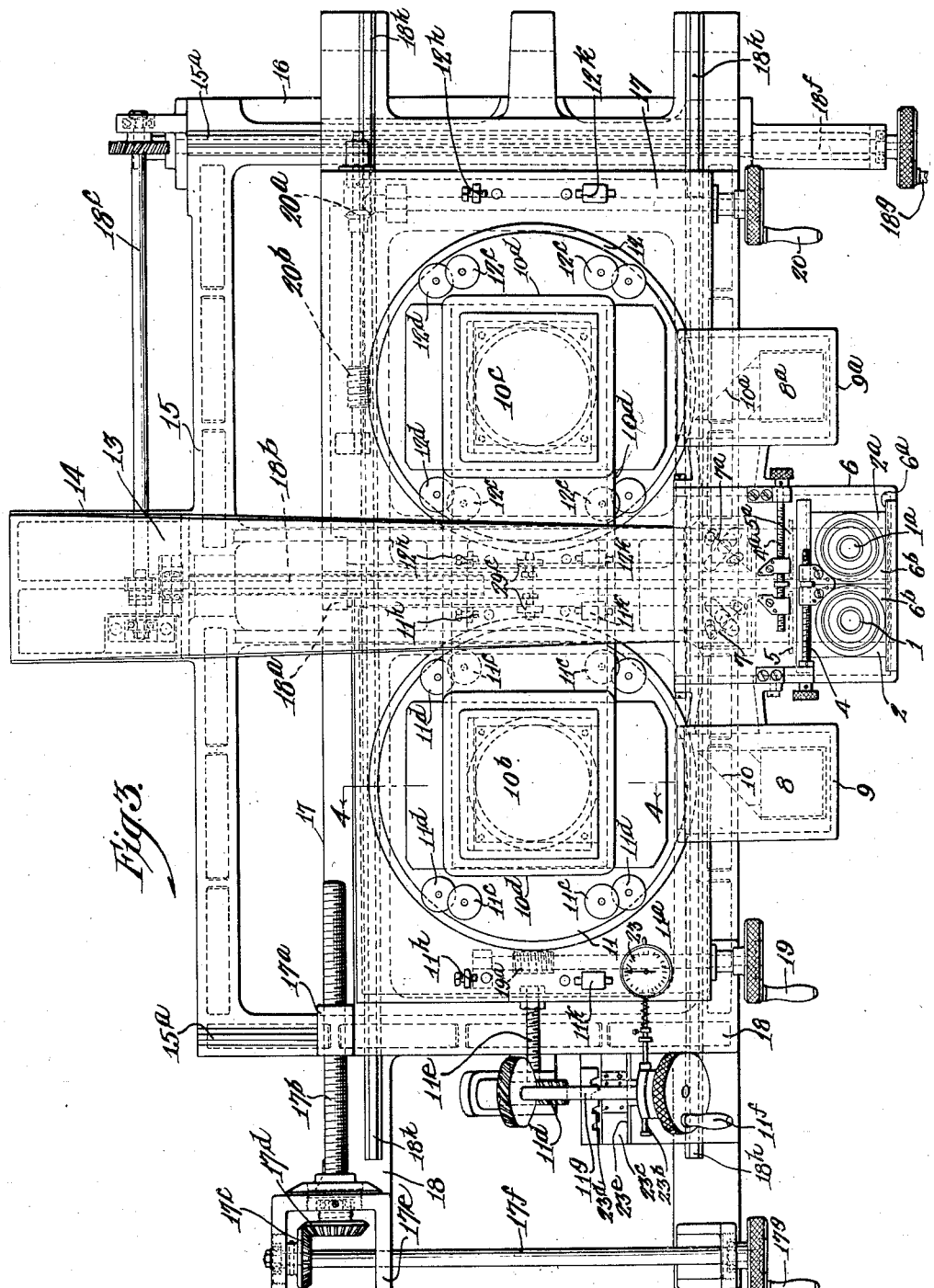

Patented Apr. 29, 1930

1,756,062

UNITED STATES PATENT OFFICE

LODEWYK J. R. HOLST, OF BROOKLINE, PENNSYLVANIA, ASSIGNOR, BY MESNE ASSIGNMENTS, TO BROCK & WEYMOUTH, INCORPORATED, A CORPORATION OF DELAWARE

MEASURING STEREOSCOPE

Application filed May 13, 1924. Serial No. 712,987.

In an application filed February 16, 1924, Serial Number 693,191, by me in connection with Arthur Brock, we have described a method of making orthographic contour maps from a series of overlapping aerial photographs, in which method a measuring stereoscope is employed to measure the parallax differences of points of known elevation appearing in stereoscopic pairs selected from said series of views to determine with great accuracy the distances between the center of each view and the conjugate center of the other view as they appear on each view, and to indicate on each view the contour lines of the country shown in the stereoscopic pair. My present invention consists in an improved stereoscope especially adapted for use in said method of map making and has for its object, and the object of my invention is, in a stereoscope having two view supporting turntables and means for adjusting said turntables together and also with respect to each other, to provide effective means for centering and aligning the views under observation, for making the necessary measurements, and for clearly indicating contour lines, a novel element in the combination making up such means consisting of fine cross hairs located in the focal planes of the eye pieces with their intersections coinciding with the optical axes of the eye pieces. The horizontal hairs lying in the line connecting the optical axes and the vertical hairs extending at right angles thereto. Another novel feature of my construction having for its object the correct location with reference to the eye pieces of the centers of the plates under observation, consists in a pair of detachable rulers for locating the center of each turntable and bringing it into coincidence with the cross hair intersection of its particular eye piece.

Another object of my invention is to so construct the stereoscope that the eye pieces and objectives of the two telescopes can be adjusted without affecting the position of the prism system of the telescopes which can and should occupy fixed positions in the apparatus.

Another feature of my improved apparatus consists in providing in connection with the turntable supporting the glass view, means for illuminating the views and for varying the intensity of the illuminating means for each turntable. Still another feature of my invention consists in means for locating the surfaces of two glass plate views under observation in the same plane.

The nature of my improvements will be best explained in connection with the drawings which illustrate my improved stereoscope and in which Figure 1 is a front elevation.
Figure 2 is a side elevation.
Figure 3 is a plan view.
Figure 4 is a cross section on line 4—4 of Fig. 3.
Figure 5 is a plan view of the detachable ruler and of the means for securing it in place over a turntable.
Figure 6 is a side elevation of the ruler.
Figure 7 is a sectional elevation of one of the eye pieces, and
Figure 8 is a plan view of the adjustable ring carrying the cross hairs.

16 is the base plate of the stereoscope having openings $16^a$ and $16^b$ which lie below the turntable boxes to be described and under which extend reflectors indicated in dotted lines in Fig. 1 at $16^c$. $16^d$ are light bulbs connected in circuit with rheostats shown at $22^a$ and $22^b$. 15 is a frame fixed to base 16 having openings which register with openings $16^a$ and $16^b$ and having guideways $15^a$ extending from front to back. 18 is a frame slidingly supported on guideways $15^a$ and carrying transverse guideways $18^h$. This frame, like frame 15, is open to the passage of light from lamps $16^d$, and is provided with a nut $18^a$ in which rotates the screw $18^b$ actuated by the knob $18^g$ through shafts $18^f$ and $18^e$, the shafts and screws being gear connected, as shown. 17 is a frame sliding on guideways $18^h$ and actuated by a screw $17^b$ turning in a nut $17^a$ secured to frame 17 and actuated by a knob $17^g$ through shaft $17^f$ and gears $17^c$ and $17^d$, said gearing being supported on slide 18.

11 and 12 are turntables rotatably supported in boxes $11^a$ and $12^a$, the box $12^a$ is fixedly secured to slide 17 and the box 11ª is movably secured to said slide in guides 11°, see Fig. 4, and is adjusted thereon by means of screws 11°, a nut gear 11ᵈ and a knob 11ᶠ, shaft 11ᵍ and a gear meshing with nut gear 11ᵈ. On each turntable box are secured the set screws 11ʰ, 11ʰ, and 12ʰ, 12ʰ, and 29°, and spring plungers 11ᵏ, 11ᵏ and 12ᵏ, 12ᵏ for use in connection with detachable rulers to be described.

The turntables are provided with annular racks as 11ᵐ, Fig. 4, and turntable 11 is rotated by a knob 19, and worm 19ª while turntable 12 is actuated by knob 20 on the end of a shaft which, by gears 20ª, actuated worm 20ᵇ. 11°, 11°, etc. and 12°, 12°, etc. are thin flanges secured at a fixed distance from the tops of the turntables and serving to position the glass plates which are pressed up against them by spring plungers 11ᵈ and 12ᵈ.

14 is a raised extension of base 16, which supports a goose neck 13 which in turn supports the optical elements of the stereoscope. 6 is a box supported on the end of goose neck 13, having openings through its top for the eye piece and guideways 6ª, in which move slides 6ᵇ, 6ᵇ. Secured to slides 6ª are the eye piece cylinders 1, the downwardly extending ends 1ª of which receive the ring 1°, in which are secured the cross hairs 1ᶠ and 1ᵍ. The upper part of cylinder 1 is provided with a pin 1°, and lower down with a vertical groove 1ᵈ. 2 is a marked ring fitting over the end of cylinder 1, and secured to a cylinder 2ª which extends into cylinder 1 and is provided with a groove 2ᵇ, in which fits the pin 1°. 3 is a cylindrical casing fitting in cylinder 2ª and secured to move longitudinally with it, but prevented from rotating by a pin 3° fitting in groove 1ᵈ. 3ª is the eye lens and 3° the field lens of the eye piece. 4 is a right and left screw by means of which the slides 6ᵇ are adjusted. 5 and 5ª are the objectives which, like the eye pieces, are adjustable towards and away from each other and 4ª is a right and left screw for adjusting them. 5ᵇ 5ᵇ are prisms which reflect the rays passing horizontally from objective lenses 5 and 5ª upward into the eye pieces, and 7 and 7ª are prisms, also held in box 6, which reflect the rays from the prism system to be described, into the objective lenses. 9 and 9ª are prism holding boxes firmly secured to the sides of box 6, and containing the single reflecting prisms 10 and 10ª and the double reflecting prisms 8 and 8ª which receive the rays transmitted through prisms 10ᵇ and 10° supported on cross arms 10ᵈ extending from goose neck 13, said prisms 10ᵇ and 10° being so positioned as to receive the rays from the views on the turntables.

29, Figs. 5 and 6, indicates one of my removable rulers best made up of an aluminum plate with an opening 29° and hardened steel corner pieces 29ᵈ. On the under side of opening 29° a glass plate 30 is secured by clamps 29ª and adjusting set screws 29ᵇ. The plate C has a longitudinal line c—c etched on it and a short right angle line c' to mark the center point of the turntable.

23 is a dial gauge secured on box 11ª and operated by a direct butting pin 23ᵇ secured to a block 23° mounted between guides 23ᵈ and 23°. The guide 23ᵈ is notched, as shown and the block can be adjusted in any of these notches to vary the position of the butting pin.

In the operation of my stereoscope in the examination, measuring and other treatment of the stereoscopic pairs of aerial views, it is necessary that the views should be so placed on the turntable that their center points shall coincide with the turntable centers and that, for the proper angular adjustment of the views, their center points should accurately coincide with the lens center, as indicated by the cross hairs, when each view is observed through its individual telescope. For this purpose I provide the detachable rulers 29 which, after a glass view is placed on a turntable with its upper surface held against the discs 11° by the plungers 11ᵈ, is placed over the view with its corners held against the set screws 11ʰ by the plungers 11ᵏ and its end abutted against the set screw 29ᵇ. This adjustment of the set screws is such as will bring the intersection of the lines c—c and c' into coincidence with the center of the turntable and the glass plate is adjusted under the ruler until its center point coincides with the point of intersection of the ruler lines. The turntable is then adjusted by means of slides 18 and 17 until the centers of the plates coincide with the cross hairs of the individual telescopes and then the turntables are rotated until the lines of each view which connect the center point of a view with the conjugate center point of the other view, coincide with the horizontal lines c—c. This secures the correct angular adjustment of the plates for the further work to be done in the sterescope and after this is effected the rulers are removed. In the use of my stereoscope it is necessary that the telescopes should be adjusted to suit various pupillary distances and it is highly undesirable that the entire system of optical elements making up the telescopic systems should be shifted in position. I have therefore so constructed my telescopes that the entire system of prisms by means of which the light rays are transmitted from the views to the objective and eye pieces are and remain in fixed position with reference to the frame of the stereoscope, while the eye pieces and the objective lenses 5 and 5ª can be, as described, adjusted towards and away from each other.

These adjustments make no change in either the first or second conjugate focal distances. The cross hairs which I locate in the focal plane of each telescope with their intersections in the optical axis of the eye pieces and the horizontal hairs are aligned with each other with the vertical hairs intersecting them at right angles and, of course, running parallel to each other. It is a well known phenomenon that two vertical lines in the field of the stereoscope will place themselves, apparently, in the image space at a distance controlled by the amount of eye convergence required for their simultaneous observation but the horizontal hairs do not assume any space position of their own and their space position appears to conform with that of the vertical hairs. This is absolutely true under all conditions at and for a short distance from the point of intersection, though it is also true that when a stereoscopic image shows surface inequalities the horizontal hairs at a short distance from the point of intersection will appear to bend themselves in conformity with the surface of the stereoscopic image. This, however, is in nowise objectionable for my purposes because my principal use for the cross hairs is to line up the plates for observation but it makes it advisable in adjusting the plates to and from each other, to determine the elevation of a point or points in the views, to do so in such a way that the cross hairs will appear to move downward towards the ground. I use fine spider silk for my cross hairs and even at the highest magnification this obscures practically none of the views.

The control of the degree of illumination given to each plate by rheostats enables me to give equal brightness to plates of varying capacity.

I will now describe the manner in which the prism-system in each of the telescopes cooperates with the lens and the eye-piece to produce an erect image in the field of view of each eye-piece.

The eye-pieces having positive focal lengths merely magnify the images produced by the objective in the focal plane of the eye-piece, and consequently these images must be erect in themselves.

As the image formed by a positive-focus objective is always inverted in both axes, that is: top and bottom as well as right and left are reversed as compared to the object depicted, the prism system is arranged to also produce a reversal in both axes so that the image has suffered two complete reversals and consequently is erect as compared to the object.

It will be noted that the reflecting surfaces of the prisms 10$^b$ and 10$^c$ and of the prisms 8 and 8$^a$, all of which are between the objects and the objectives, see Fig. 3, are inclined with relation to a horizontal plane, as shown in Fig. 2. These prisms are thus to be considered as horizontal mirrors, which reverse top and bottom of the reflected image, but do not affect the right and left position. The same applies also to the prisms 5$^a$ inserted in the space between the objectives and the eye pieces. The prisms 10 and 10$^a$ have their reflecting surfaces in vertical planes, (Fig. 3), and consequently act as vertical mirrors, that is, they reverse the right and left position of images they reflect, but do not reverse the top and bottom position.

The prisms 8 and 8$^a$ have each two reflecting surfaces, the lower ones being parallel to the reflecting surfaces of the large prisms 10 and 10$^a$ (see Fig. 2). Parallel reflectors serve merely to displace images bodily, without influencing the relative directions. The images will thus leave the first reflecting surface of the prisms 8 and 8$^a$ in the same way in which they received them from the prisms 10 and 10$^a$, i. e., in reversed order of top and bottom. Consequently after reflection by the upper surfaces of the prisms 8 and 8$^a$, a second reversal has taken place, and the images leave these prisms in correct top and bottom relation. As there are no more horizontal reflecting surfaces between the prisms 8 and 8$^a$ and the objectives, the images reach the latter in erect position and are consequently again inverted after passage through the lens. They then strike the prisms 5$^b$ which finally send the image upward to the focal plane of the eye-piece and in so doing erect it in so far as top and bottom are concerned.

No right and left reversal takes place before the images reach the first vertical reflecting surfaces 10 and 10$^a$ in correct left and right position but emerge therefrom with 90° deflection with the result that, after similar deflection on the surfaces 7 and 7$^a$, complete right and left reversal has taken place. The objectives will again reverse this order, and since there are no vertical reflectors behind the objectives, this double reversal will bring the image correct as to right and left position in the focal plane of the eye-piece. In this manner the images magnified by the latter, have been re-erected completely by the co-operative action of the prisms and the objectives, and will thus be observed in the same relative position as given to the plates inserted on the turntables.

Tracing the course of the light as it travels upward through the plates, it first reaches the large prisms 10$^b$ and 10$^c$ (Fig. 2), is then horizontally deflected to the lower reflecting surfaces of the prisms 8 and 8$^a$ which deflect the light upward to their upper reflecting surfaces which in turn send it back parallel to the direction in which it entered the prisms 8 and 8$^a$—the light then reaches the prisms 10 and 10$^a$ (Fig. 3), by which it is deflected 90 degrees in a horizontal plane, toward the prisms 7 and 7$^a$; these prisms again deflect the light course by 90° in the same plane, sending it into the objectives 5 and 5$^a$. From the objective the light continues toward the prisms 5$^b$ which finally deflect it 90° upward into the focal plane of the eye piece 2, where the image of the views on the plates is formed in the same position it occupies on the plates.

Having now described my invention, what

I claim as new and desire to secure by Letters Patent, is:

1. In a measuring stereoscope comprising turntables for holding the views, means for simultaneously adjusting said turntables and for adjusting them with respect to each other in one direction, means for measuring the adjustment of the turntables with respect to each other and stereoscopic telescopes for each turntable, the combination therewith of right angle cross hairs located in the focal plane of each telescope eye piece with their intersections coinciding with the optical axes of each eye piece and with horizontal hairs lying in the line connecting the optical axes and parallel to the direction of independent adjustment of the turntables.

2. In a measuring stereoscope comprising a base and means for supporting and adjusting views thereon, the combination with said base of a frame for supporting the telescopes rigidly secured to the base, a pair of stereoscopic telescopes comprising prisms, objectives and eye pieces, of which the prisms are secured to the frame in fixed positions and the eye pieces and objectives are adjustable towards and away from each other thereon.

3. A measuring stereoscope having the constructive features of claim 1, provided with detachable rulers for visibly indicating the centre of rotation of the turntables.

LODEWYK J. R. HOLST.